F. MATOUSHEK.
CULTIVATOR BLADE.
APPLICATION FILED APR. 26, 1920.

1,402,878.

Patented Jan. 10, 1922.

Inventor
Frank Matoushek.

Witness

By Lacy & Lacy, Attorneys

UNITED STATES PATENT OFFICE.

FRANK MATOUSHEK, OF COLOME, SOUTH DAKOTA.

CULTIVATOR BLADE.

1,402,878.  Specification of Letters Patent.  Patented Jan. 10, 1922.

Application filed April 26, 1920. Serial No. 376,751.

*To all whom it may concern:*

Be it known that I, FRANK MATOUSHEK, a citizen of the United States, residing at Colome, in the county of Tripp and State of South Dakota, have invented certain new and useful Improvements in Cultivator Blades, of which the following is a specification.

This invention relates to rotary cultivators and has special reference to the ground-engaging member and the means for securing the same to the cultivator shaft. The invention is illustrated in the accompanying drawing and consists in certain novel features which will be specifically pointed out in the claim following a detailed description.

In the drawings—

Figure 1:
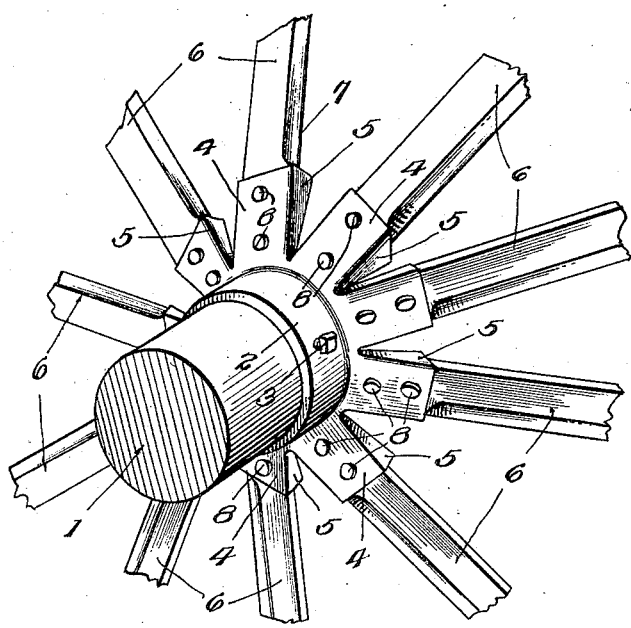
Figure 1 is a perspective view of a cultivator blade embodying my present invention.
Figure 2:
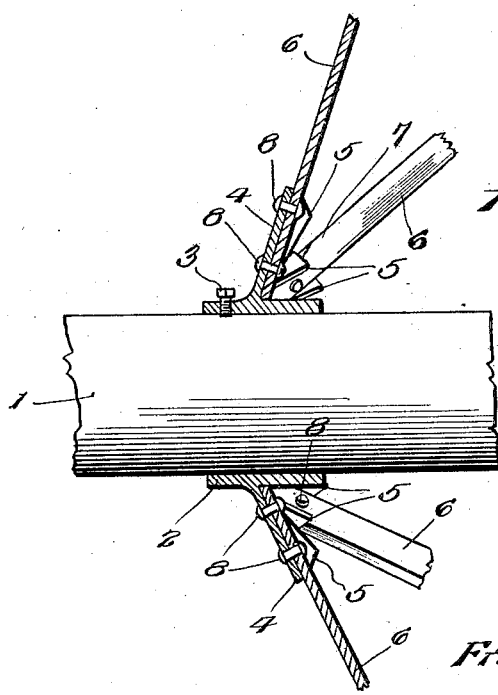
Fig. 2 is a longitudinal section of the same.

The cultivator shaft 1 is of the usual dimensions and is mounted upon the cultivator frame for free rotation in any preferred manner. In carrying out my present invention, I employ a collar or hub 2 which is of an internal diameter such that it will fit snugly upon the shaft 1, as shown, and may be secured to the shaft by a set screw 3 or any other well-known device. Radiating from the collar or hub member 2 intermediate the ends thereof are arms 4 which are set somewhat obliquely relative to the axis of the hub and are provided at their side edges with lips 5 between which the ends of the blades 6 are received. The blades 6 will preferably be of properly tempered steel and have their forward longitudinal edges tapered or otherwise reduced to a cutting edge, as indicated at 7. The width of each blade should be such that it will fit closely between the lips 5 and will be thereby held against vibration and prevented from being forced backwardly and being released under contact with the surface of the ground. Bolts or rivets 8 are inserted through the inner end of each blade and the corresponding arm 4, as clearly shown, so that the blade will be rigidly secured in the socket formed by said arm and the lips 5 at the edges of the same. It will be noted that the lips 5 are inclined or tapered in the direction of the shaft so as to form, in effect, spaced spurs or teeth on the outer ends of the arms 4 which tend to break up or pulverize the soil as the cultivator is drawn over the field.

As the cultivator is drawn over the field the shaft 1 is rotated and the several blades 6 thereby brought successively against the surface of the soil so as to cut into and turn over the same, it being noted that the blades are preferably straight and, therefore, extend from the main shaft obliquely owing to the fact that they are secured to the obliquely disposed arms 4. The device can be very easily and quickly fitted to the cultivator shaft and should any one blade be broken or otherwise rendered useless it can be very quickly withdrawn and a new blade substituted therefor without requiring the machine to be laid aside and without requiring a new set of blades. The device is very simple in construction and will not add any appreciable weight to the cultivator but will decrease the weight if it be substituted for the ordinary disk cultivator.

The present invention is intended more particularly for use in connection with the machine disclosed in Letters Patent, No. 1,210,511, granted to me January 2, 1917.

Having thus described the invention, what is claimed as new is:

1. The combination with a cultivator shaft, of a collar secured thereon and provided with a plurality of spaced radial arms disposed obliquely relative to the axis of the cultivator shaft, a plurality of flat blades each having its inner portion fitted flat against one of said arms, and spaced longitudinally disposed lips formed on the arms and arranged at substantially right angles thereto with their outer ends projecting laterally beyond the adjacent flat faces of the blades and with their longitudinal edges tapered in the direction of the shaft whereby to form spaced spurs at the outer end of each arm for pulverizing the soil.

2. The combination with a cultivator shaft, of a collar secured thereon and provided with a plurality of spaced radial arms between its ends, each of said arms being disposed obliquely relative to the axis of the cultivator shaft and having its side edges at its free end with lateral lips which taper toward the shaft, and a plurality of relatively flat blades each provided with a cutting edge and each having its inner portion bearing against the collar and the inner face of the adjacent arm between the lips thereon and rigidly secured thereto, the wide end of the lips being projected beyond the adjacent flat faces of the blades to form a circumferential series of spurs entirely surrounding the shaft at the fixed ends of the blades for pulverizing the soil.

In testimony whereof I affix my signature.

FRANK MATOUSHEK. [L. S.]